Aug. 11, 1959 W. R. CHEETHAM ET AL 2,899,489

TELEVISION TRANSMITTING APPARATUS

Filed April 4, 1955 2 Sheets-Sheet 1

Inventors
William R. Cheetham
William G. Parr
By Holcombe, Wetherill & Brisebois
Attorneys

TELEVISION TRANSMITTING APPARATUS

Filed April 4, 1955 2 Sheets-Sheet 2

Inventors
William R. Cheetham
William G. Parr
By
Holcomb, Wetherill & Brisebois
Attorneys United States Patent Office 2,899,489

Patented Aug. 11, 1959

2,899,489

TELEVISION TRANSMITTING APPARATUS

William Roger Cheetham and William Geoffrey Parr, Cambridge, England, assignors to Pye Limited, Cambridge, England, a British company Application April 4, 1955, Serial No. 499,097

Claims priority, application Great Britain April 7, 1954

6 Claims. (Cl. 178—5.4)

The present invention relates to television transmitting apparatus, particularly to apparatus for transmitting colour television signals.

It is the particular object of the present invention to provide a transmitting system for transmitting colour television signals employing a single television pick-up tube having a single scanning gun.

According to the invention there is provided colour television transmitting apparatus comprising a television pick-up tube, a multiple filter divided into a plurality of sets, each set comprising a group of filter elements, means for projecting an image of the scene or object to be televised onto said multiple filter, means for flooding said filter with radiation of a kind to which said tube is sensitive, a target upon which a combined electron or optical image of said irradiated filter is formed, means for scanning said target to generate a waveform containing a plurality of sequences each representing the individual filtered components of the scene or object, standing on a pedestal waveform representing the filtered components of the said flooding irradiation, means for separating all or part of the pedestal waveform from the complete signal, a plurality of signal channels, means for producing a plurality of pulses or trains of pulses, each pulse or train occurring respectively during the time instants i.e. time interval of the waveform corresponding to one of the said filtered components, means for feeding the combined waveform to each of the signal channels, and means for applying the pulses or trains of pulses respectively to the signal channels so that each channel passes only those successive signal that are representative of information due to irradiation through filter elements of the same kind.

The filter may comprise a structure of coloured transparent lines or stripes, the lines or stripes being for example alternately red, green and blue in repetitive sequence and arranged transversely to the direction of line scanning of the scanning beam of the tube. However, they need not be directly transverse but could be arranged at an oblique angle to the line of scanning.

With such a regular filter structure, it is possible to generate the pulses or trains of pulses externally, provided that truly linear scanning is obtainable, but they may be derived from the pedestal waveform or from a part of that waveform.

Alternatively the filter may be in wavy lines or in discrete areas such for example as dots, triangles or squares in which case it is probably not possible to generate the pulses or trains of pulses externally and it may be necessary to derive them from the pedestal waveform or from a part thereof. In the case where a part of the pedestal waveform is used, at least some of the sets of filter elements, and preferably each of them, may include an area opaque to irradiation for which the tube is sensitive so that in addition to the pedestal waveform referred to, which is due to the filter components per se, the waveform includes separate pedestal components due to the said opaque areas. The channel routing pulses can then be produced from the said separate pedestal components by producing a plurality of delayed trains therefrom equal to the number of individual filtered components, each train having a delay so that it occurs respectively during the time instants i.e. the time interval of the waveform corresponding to one of the said filtered components. These trains of delayed pulses are then applied respectively to the signal channels so that each channel passes only those successive signals that are due to a single filtered component.

Conveniently the system may be a three-colour system and the transparent filter areas may be red, green and blue, the opaque areas being black.

Alternatively, according to another feature of the invention, the multiple filter may include areas which are transparent to all visible light in order that a greater amount of the detail in the original scene or object may be passed through those areas compared to the detail which is passed by those filter elements passing only light of a particular colour. In such a case it is not necessary to employ areas of three different colours but only of two colours, and in one example of such a filter, the ratio of the number of filter elements transparent to all visible light to the number of filter elements transparent to light of either one of the two colours may be 3:1. In a specific embodiment of such a filter structure which also incorporates opaque areas, each set may comprise elements in the following sequence: opaque, transparent to all visible light, red, transparent to all visible light, blue, transparent to all visible light.

The filter may conveniently be made on a colour film, preferably a film comprising a plurality of superposed layers. Convenient colour emulsions are manufactured under the registered trademarks "Kodachrome" and "Ektachrome." Alternatively, the filter may be made by other photographic methods or by ruling, dyeing or any other method found suitable.

The expression "filter element" denotes an element which has the property of passing some or all radiation of a predetermined wavelength or wavelengths. The different filter elements in a sequence may have pass bands which are different and/or overlapping. The expression "filtered component" denotes the energy which has passed through filter elements of a particular type.

The video signal applied to the gates may be delayed so that a gating pulse derived from a pedestal pulse may gate a portion of the waveform preceding the pedestal pulse. Means may also be provided whereby the loss of fine detail due to the finite size of the scanning spot can be reduced, and according to this aspect of the invention, the complete video signal may be delayed by the time required to scan one strip width, i.e. one filter element of the multiple filter structure, and suitable fractions of the undelayed video signal and of the video signal delayed by the time required to scan two strip widths, i.e. two filter elements, may be subtracted from it.

In order that the invention may be more clearly understood, reference will now be made to the accompanying drawings, which show, in schematic form, two specific arrangements according thereto by way of example, and in which Fig. 1 is a schematic view of certain apparatus which may be used in carrying the invention into effect, Fig. 2 shows a portion of a first specific embodiment of a filter structure.

Figures 1, 2:
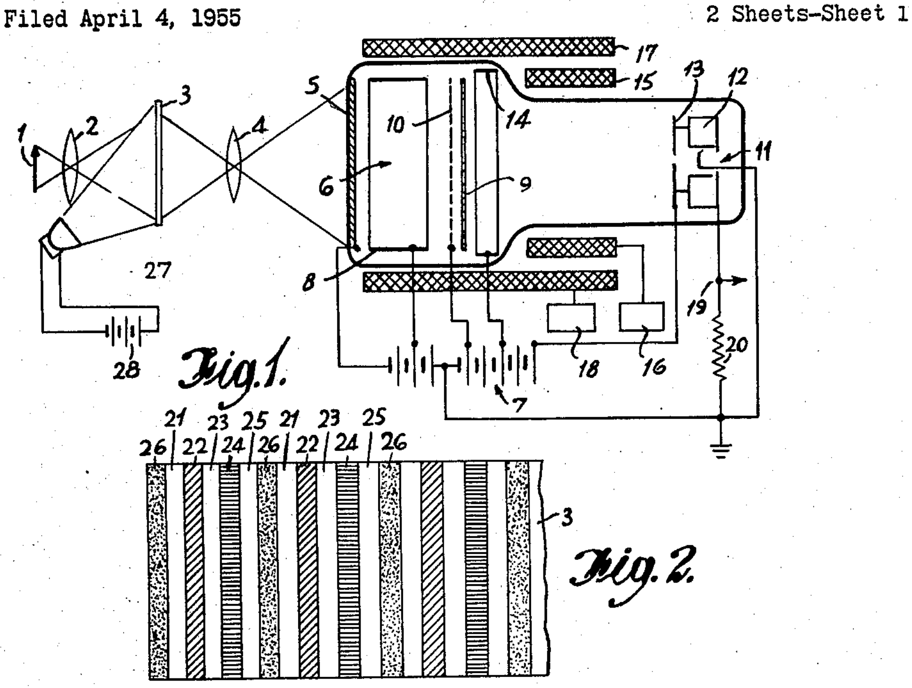

In the drawings, referring to Fig. 1, 1 represents an object or scene being televised, an image of which is focussed by means of a lens system 2 on to a multiple filter 3, subsequently to be described in more detail with reference to Figs. 2 or 6. A further lens system 4 is provided for focussing an image of the filter 3 on to the photo-cathode 5 of a television pick-up tube 6 of a conventional type.

Whilst the particular type of pick-up tube used for performing the invention is immaterial, it is preferable to utilise a tube of the kind generally referred to in this art as a high sensitivity tube, and for this reason the tube depicted is of the kind known as a "multiplier image orthicon." Therefore, although the invention will hereinafter be described in conjunction with the use of such an image orthicon tube, it should be clearly understood that the invention is not limited to the use of this kind of tube.

A conventional multiplier image orthicon tube is shown in Fig. 1 but, since the method of its operation is so well-known in this art, it will not be further described here. The usual tube components and ancillary apparatus are shown for reference purposes, the tube being operated from a source or sources of potential schematically illustrated for convenience as a battery 7. Apart from the photo-cathode 5 already referred to, there is provided an accelerating electrode 8 for accelerating the electrons from the photo-cathode onto a target electrode 9, in front of which is located a secondary-electron-collecting mesh electrode 10. The cathode gun for producing a beam of scanning electrons is schematically shown at 11 and the electron multiplier at 12, including an apertured first dynode 13. The decelerator electrode is shown at 14. The horizontal and vertical deflection coils 15 are energised from suitable deflection-voltage generators schematically illustrated at 16, and the focussing coil 17 is energised from a source 18. The output signal from the tube is taken off, after electron multiplication, at 19 across the output load impedance, shown for convenience as a resistor 20. The relative magnitudes and signs of the potentials applied to the tube components are indicated by their relative positions of connection to the battery 7.

A first embodiment of the multiple filter 3 is shown more particularly in Fig. 2 and comprises a sequence of areas in strip form, some of which possess the property of passing various wavelengths of the light spectrum and others of which are opaque to light to which the tube is sensitive. The pass bands for each of the areas passing light may be different and/or overlapping, and the sequence of areas is preferably symmetrically repetitive, as indicated, although not necessarily so. In the specific example of filter structure shown in Fig. 2, the filter comprises alternate strips as follows: transparent to all visible light at 21, transparent to red light at 22, transparent to all visible light at 23, transparent to blue light at 24, transparent to all visible light at 25, black, i.e. opaque, at 26. Fig. 2 shows only a portion of the filter structure including only a few sets of such groups of filter elements.

The filter 3 is flooded by white light from a light source schematically shown at 27, which is energised by a suitable source of potential which is schematically illustrated as a battery 28.

The lens system 4 focusses an image of the filter structure 3 on to the photo-cathode 5 and since an image of the scene or object 1 is focussed on the filter 3, there is then focussed on to the photo-cathode 5 an image of the filtered object or scene 1 superimposed on an image of the filter. The combined light image on the photo-cathode 5 produces a combined electron image on the target electrode 9 and it is arranged that the electron image of the filter at the target electrode 9 due to the flooding light from the source 27 causes an electrical response smaller than that due to the image of the brightest part of the viewed object or scene 1. The multiple filter 3 analyses the flooding light and the image of the viewed scene or object into a series of strips at the target electrode 9, each of which strips is due to light of a particular spectrum band width or light of the whole visible spectrum, as the case may be, together with certain other areas corresponding to the opaque strips 26 where no actinic light is present.

Figure 3:
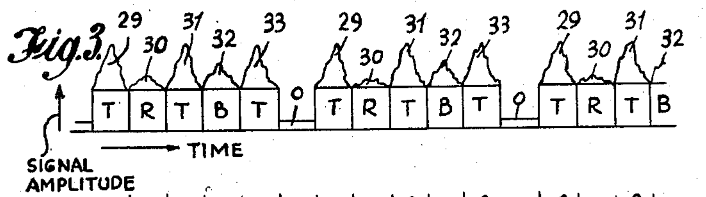
Fig. 3 shows an example of a portion of a complete video waveform as generated on scanning utilising a filter structure as shown in Fig. 2.

Upon scanning by the electron beam from the gun 11 previously referred to, there is produced a video signal output across the output impedance 20, the nature of which is illustrated in Fig. 3. This waveform contains a plurality of sequences 29, 30, 31, 32, 33 representing the individual filtered components of the scene or object standing on a pedestal waveform representing the filtered components of the flooding light and indicated by T R T B T in sequence. In this sequence T, R and B indicate the components due to the strips which are transparent to all visible light, red light and blue light respectively. There is also a separate pedestal component representing the opaque areas of the multiple filter and shown at O. It will be understood that the part of the waveform illustrated does not depict any of the other components required and normally present in complete video waveforms to ensure effective transmission and subsequent reception of television signals. Such other components, e.g. synchronising pulses and so on, are omitted only for the sake of clarity and because they do not per se have any inventive significance herein.

Figure 5:
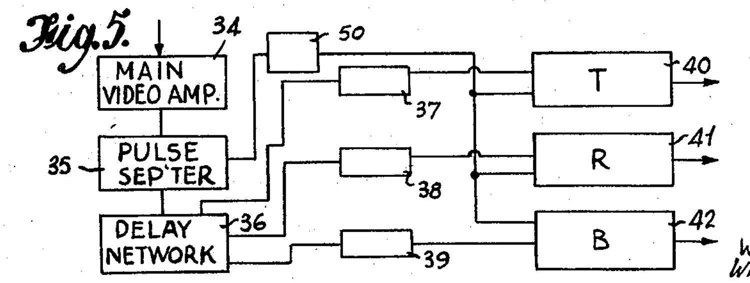
Fig. 5 shows schematically one form of circuit arrangement for processing the video signal.

This composite waveform is then routed as shown in the schematic circuit arrangement of Fig. 5. The waveform is first passed to a main video amplifier 34, after which all or part of the pedestal waveform together with the separate pedestal components are separated from the composite video signal by a pulse separator device 35 and the separate pedestal components are then delayed by the delaying network 36 and processed in separate signal processing circuits, schematically shown at 37, 38, 39 to form gating pulses respectively delayed by suitable amounts, which gating pulses are used for gating separate video amplifiers 40, 41, 42, one for each type of light-transmitting area of the mupltiple filter. These amplifiers are respectively labelled T R and B to denote the corresponding areas of the part waveform shown in Fig. 3. The amplifiers 40 to 42 are gated synchronously with the component video signals corresponding to their respective colour filter areas, after passing through the processing circuit 50. The processing circuit 50 may, for example, be required to delay the video signal by a specific amount and may additionally act as a D.C. inserter and level raiser. The routed colour components of the video signal may be processed in any desired manner according to techniques well-known in the art, for example by passing them through separate suitable low-pass electrical filters to remove the gating pulse structure which would otherwise be visible on a receiver picture tube. The circuit arrangements schematically illustrated in Fig. 5 are so well-known in the art and may be of such diverse forms that, for the sake of simplicity, they are not described here, particularly also as these arrangements form no part of the invention per se. Subsequently, the filtered signals may be matrixed (as understood in the art) in any desired manner. For example, they may be matrixed to form signals corresponding to the red, green and blue components in the original scene or object. Alternatively any desired combinations of signals corresponding to the red, green and blue components in the scene or object may be formed. By these means the signals may be caused subsequently to produce a tri-colour television signal which is completely compatible with normal black and white transmissions. The term "compatible" is a term that is well understood by those skilled in the art of colour-television-transmitting systems.

Figure 4:
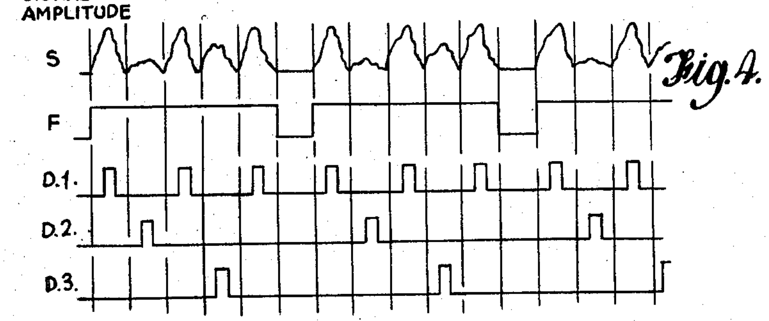
Fig. 4 shows the separated parts of the waveform of Fig. 3 and three delayed trains of gating pulses associated therewith.

The gating pulses referred to are delayed by separate amounts respectively representative of the time separation of the individual colour components of the video waveform and the separated components are shown in Fig. 4 in which S represents the scene components, F represents the filter components and $D_1$, $D_2$, $D_3$ the delayed gating pulses for the transparent, red and blue areas respectively. In practice, it may be desirable to arrange that the gating pulses sample only about 15–20% of the information afforded by their respective filter element types. Hence, the pulse widths are each diagrammatically shown as being narrower than one filter strip width.

It will be understood that the relative ratios of the numbers of filter elements with different colour transmission properties per set may be so chosen as to give desired ratios of resolution of detail in the corresponding video signals after separation by the gating pulses.

Thus, using a single pick-up tube having only one scanning gun, a complete three colour television signal can be transmitted, and the signal is such that it can also be reconstituted by an ordinary black and white receiver arrangement. The invention thus provides a fully compatible colour television signal.

Alternatively, the colour component outputs of the separate video amplifiers may be transmitted on three separate channels, each channel giving information concerning a single colour component of the viewed scene or object.

Figure 6:
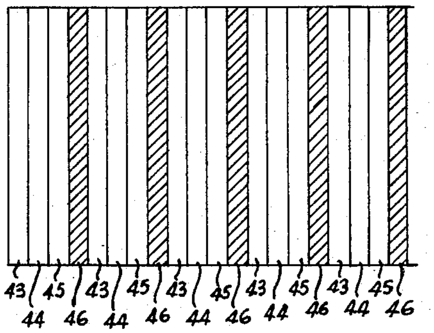
Fig. 6 shows a portion of a second specific embodiment of a filter structure.

Fig. 6 shows a portion of another form of multiple filter structure comprising red (R), green (G), blue (B) and opaque (O) areas, respectively shown at 43, 44, 45 and 46.

Figure 7:
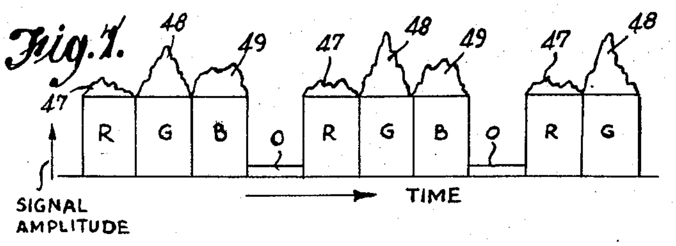
Fig. 7 shows an example of a portion of a complete video waveform as generated on scanning, utilising a filter structure as shown in Fig. 6.
Figure 8:
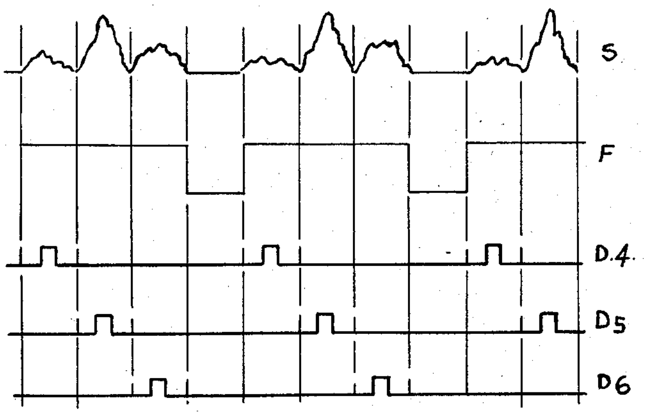
Fig. 8 shows the separated parts of the waveform of Fig. 7 and three delayed trains of gating pulses associated therewith.

With an arrangement utilising a filter structure such as shown in Fig. 6, the composite output waveform is as shown in Fig. 7 with the picture waveform elements shown at 47, 48 and 49. The processing of this composite waveform may be analogous to that shown in conjunction with Figs. 3, 4 and 5 to produce separated components as shown in Fig. 8 in which the same reference letters refer to similar components as are shown in Fig. 4. $D_3$, $D_4$ and $D_5$ represent the delayed gating pulses for the red, green and blue areas respectively. The processing circuit arrangement for this embodiment would be similar to that of Fig. 5 except that the amplifiers 40, 41 and 42 would be respectively amplifiers for the red, green and blue components instead of the transparent, red and blue components respectively. It will be understood therefore, that the arrangement of Fig. 5 is equally suitable for the embodiment of Figs. 6, 7 and 8, with the modifications to Fig. 5 referred to.

It will also be understood that the pick-up tube need not incorporate an image converter section and that in this case the composite light image would be focussed directly onto the target electrode of the tube.

Moreover, the filter may be located within the tube adjacent the front surface of the target electrode or photocathode, dependent upon the kind of pick-up tube being used.

Although the invention has been described in conjunction with a white light flooding source, any other colour may be used as found convenient. For example, with the filter structure of Fig. 6 the flooding light could be red or green to produce consequent bias pedestal components. It will also be appreciated that any convenient means for flooding the filter may be used. One particular arrangement found very effective was a partially reflecting surface placed between the lens system 2 and the filter and arranged at 45° to the longitudinal axis of the system, the flooding light source being placed directly above or directly below the mirror. Such an arrangement provided very even flooding of the filter.

Also, the invention has been described with reference to arrangements utilising visible light. Naturally, if desired, any convenient form of irradiation may be used and the pick-up tube would be one sensitive to the kind of irradiation employed.

Thus, the invention has clearly only been described by way of example and therefore various modifications to the specific details set forth could be made without in any way departing from its scope.

We claim:

1. Colour television transmitting apparatus comprising a television pick-up tube, a multiple filter divided into a plurality of sets, each set comprising a group of filter elements, some of which transmit light of only one particular colour and some of which are opaque to light, means for projecting an image of the scene or object to be televised on to said multiple filter, means for flooding said filter with radiation of a kind to which said tube is sensitive, a target upon which a combined electron or optical image of said irradiated filter is formed, means for scanning said target to generate a waveform containing a plurality of sequences each representing the individual filtered components of the scene or object, standing on a pedestal waveform representing the filtered components of the said flooding irradiation, means for separating at least part of the pedestal waveform from the complete signal, a plurality of signal channels, means for producing a plurality of pulses, each pulse occurring respectively during the time instants i.e. time interval of the waveform corresponding to one of the said filtered components, means for feeding the combined waveform to each of the signal channels, and means for applying the pulses respectively to the signal channels so that each channel passes only those successive signals that are representative of information due to irradiation through filter elements of the same kind.

2. Colour television transmitting apparatus comprising a television pick-up tube, a multiple filter divided into a plurality of sets, each set comprising a group of filter elements, some of which transmit light of only one particular colour and some of which are opaque to light means for projecting an image of the scene or object to be televised on to said multiple filter, means for flooding said filter with radiation of a kind to which said tube is sensitive, a target upon which a combined electron or optical image of said irradiated filter is formed, means for scanning said target to generate a waveform containing a plurality of sequences each representing the individual filtered components of the scene or object, standing on a pedestal waveform representing the filtered components of the said flooding irradiation, means for separating at least part of the pedestal waveform from the complete signal, a plurality of signal channels, means for producing a plurality of trains of pulses, each train occurring respectively during the time instants i.e. time interval of the waveform corresponding to one of the said filtered components, means for feeding the combined waveform to each of the signal channels, and means for applying the trains of pulses respectively to the signal channels so that each channel passes only those successive signals that are representative of information due to irradiation through filter elements of the same kind.

3. Colour television transmitting apparatus comprising a television pick-up tube, a multiple filter divided into a plurality of sets, each set comprising a group of filter elements, some of which transmit light of only one particular colour and some of which are transparent to all visible light, means for projecting an image of the scene or object to be televised on to said multiple filter, means for flooding said filter with radiation of a kind to which said tube is sensitive, a target upon which a combined electron or optical image of said irradiated filter is formed, means for scanning said target to generate a waveform containing a plurality of sequences each representing the individual filtered components of the scene or object, standing on a pedestal waveform representing the filtered components of the said flooding irradiation, means for separating at least part of the pedestal waveform from the complete signal, a plurality of signal channels, means for producing a plurality of pulses, each pulse occurring respectively during the time instants i.e. time interval of the waveform corresponding to one of the said filtered components, means for feeding the combined waveform to each of the signal channels, and means for applying the pulses respectively to the signal channels so that each channel passes only those successive signals that are representative of information due to irradiation through filter elements of the same kind.

4. Colour television transmitting apparatus comprising a television pick-up tube, a multiple filter divided into a plurality of sets, each set comprising a group of filter elements, some of which transmit light of only one particular colour and some of which are transparent to all visible light, means for projecting an image of the scene or object to be televised on to said multiple filter, means for flooding said filter with radiation of a kind to which said tube is sensitive, a target upon which a combined electron or optical image of said irradiated filter is formed, means for scanning said target to generate a waveform containing a plurality of sequences each representing the individual filtered components of the scene or object, standing on a pedestal waveform representing the filtered components of the said flooding irradiation, means for separating at least part of the pedestal waveform from the complete signal, a plurality of signal channels, means for producing a plurality of trains of pulses, each train occurring respectively during the time instants i.e. time interval of the waveform corresponding to one of the said filtered components, means for feeding the combined waveform to each of the signal channels, and means for applying the trains of pulses respectively to the signal channels so that each channel passes only those successive signals that are representative of information due to irradiation through filter elements of the same kind.

5. Colour television transmitting apparatus comprising a television pick-up tube, a multiple filter divided into a plurality of sets, each set comprising a group of filter elements, some of which transmit light of only one particular colour, at least one of which is opaque and at least one of which is transparent to all visible light, means for projecting an image of the scene or object to be televised on to said multiple filter, means for flooding said filter with radiation of a kind to which said tube is sensitive, a target upon which a combined electron or optical image of said irradiated filter is formed, means for scanning said target to generate a waveform containing a plurality of sequences each representing the individual filtered components of the scene or object, standing on a pedestal waveform representing the filtered components of the said flooding irradiation, means for separating at least part of the pedestal waveform from the complete signal, a plurality of signal channels, means for producing a plurality of pulses, each pulse occurring respectively during the time instants i.e. time interval of the waveform corresponding to one of the said filtered components, means for feeding the combined waveform to each of the signal channels, and means for applying the pulses respectively to the signal channels so that each channel passes only those successive signals that are representative of information due to irradiation through filter elements of the same kind.

6. Colour television transmitting apparatus comprising a television pick-up tube, a multiple filter divided into a plurality of sets, each set comprising a group of filter elements, some of which transmit light of only one particular colour, at least one of which is opaque and at least one of which is transparent to all visible light, means for projecting an image of the scene or object to be televised on to said multiple filter, means for flooding said filter with radiation of a kind to which said tube is sensitive, a target upon which a combined electron or optical image of said irradiated filter is formed, means for scanning said target to generate a wavefrom containing a plurality of sequences each representing the individual filtered components of the scene or object, standing on a pedestal waveform representing the filtered components of the said flooding irradiation, means for separating at least part of the pedestal waveform from the complete signal, a plurality of signal channels, means for producing a plurality of trains of pulses, each train occurring respectively during the time instants i.e. time interval of the waveform corresponding to one of the said filtered components, means for feeding the combined waveform to each of the signal channels, and means for applying the trains of pulses respectively to the signal channels so that each channel passes only those successive signals that are representative of information due to irradiation through filter elements of the same kind.

References Cited in the file of this patent

UNITED STATES PATENTS

| | | |
|---|---|---|
| 2,689,271 | Weimer | Sept. 14, 1954 |
| 2,710,309 | Autranikian | June 7, 1955 |
| 2,721,228 | James | Oct. 18, 1955 |
| 2,769,855 | Boothroyd | Nov. 6, 1956 |